United States Patent [19]

Zhen

[11] Patent Number: 6,036,220
[45] Date of Patent: Mar. 14, 2000

[54] COLLAPSIBLE TRICYCLE FRAME DEVICE

[76] Inventor: Hui-Fen Zhen, 58, Ma Yuan West St., Taichung, Taiwan

[21] Appl. No.: 08/729,861

[22] Filed: Oct. 15, 1996

[51] Int. Cl.[7] ........................................................ B62B 7/06
[52] U.S. Cl. ............................ 280/642; 280/62; 280/650; 403/102
[58] Field of Search ................................... 280/642, 648, 280/650, 47.38, 644, 641, 657, 658, 62; 403/3, 84, 99, 102, 109, 162

[56] References Cited

U.S. PATENT DOCUMENTS

| 4,491,337 | 1/1985 | Zuck | 280/278 |
| 5,590,896 | 1/1997 | Eichhorn | 280/642 |
| 5,695,212 | 12/1997 | Hinkston | 280/642 |

*Primary Examiner*—Robert J. Oberleitner
*Assistant Examiner*—Pamela J. Lipka

[57] ABSTRACT

A collapsible tricycle frame device comprises a generally U-shaped handle, first and second push bars connected to two opposite ends of the generally U-shaped handle respectively, a first seat receiving a lower end of the first push bar, and a second seat receiving a lower end of the second push bar. The first seat receives an upper end of a first front support rod and an upper end of a first rear support rod. The second seat receives an upper end of a second front support rod and an upper end of a second rear support rod. A rear wheel support device receives a lower end of the first rear support rod and a lower end of the second rear support rod. A front wheel support device receives a lower end of the first front support rod and a lower end of the second front support rod. First and second base rods are disposed between the front wheel support device and the rear wheel support device.

3 Claims, 7 Drawing Sheets

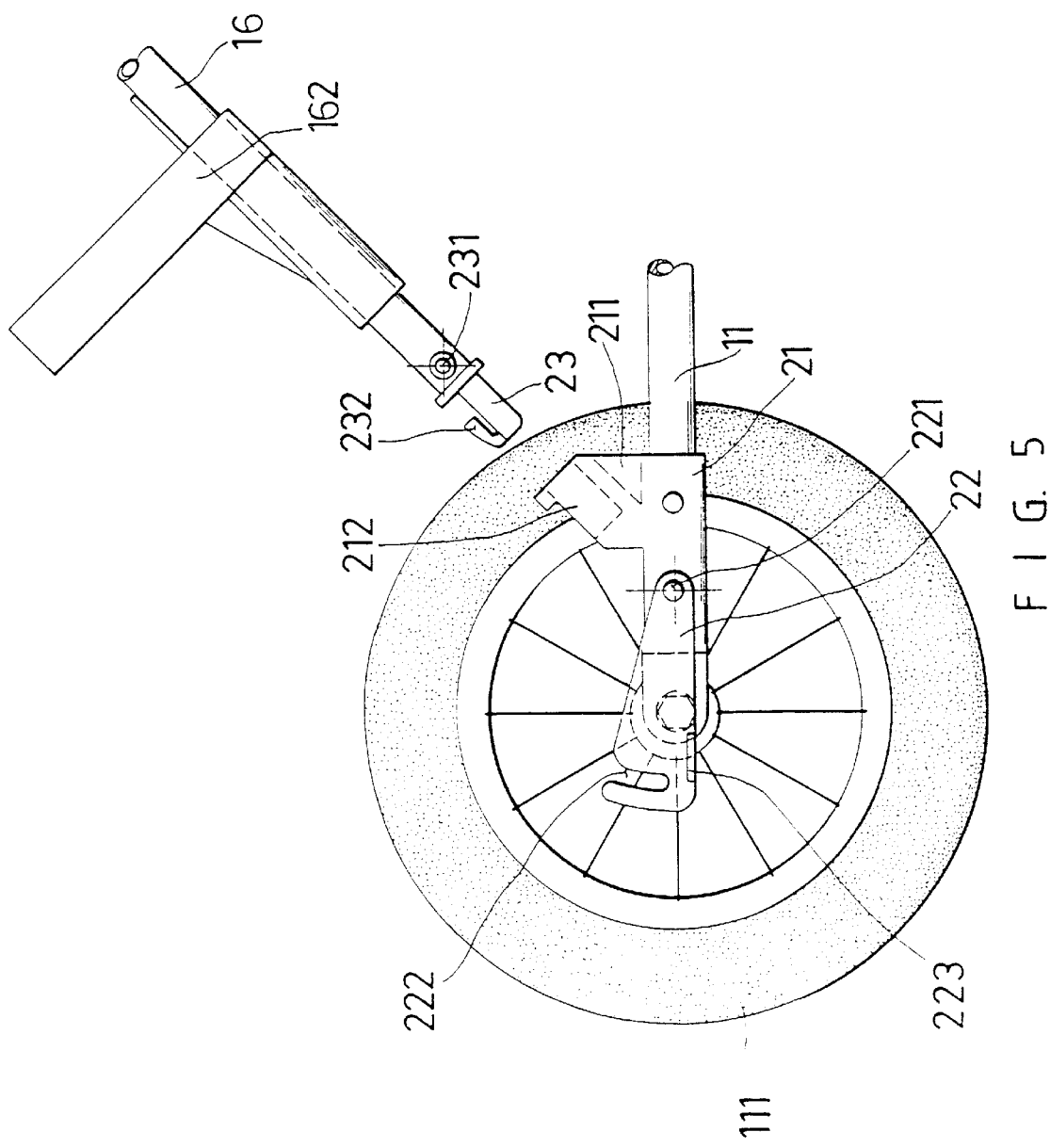

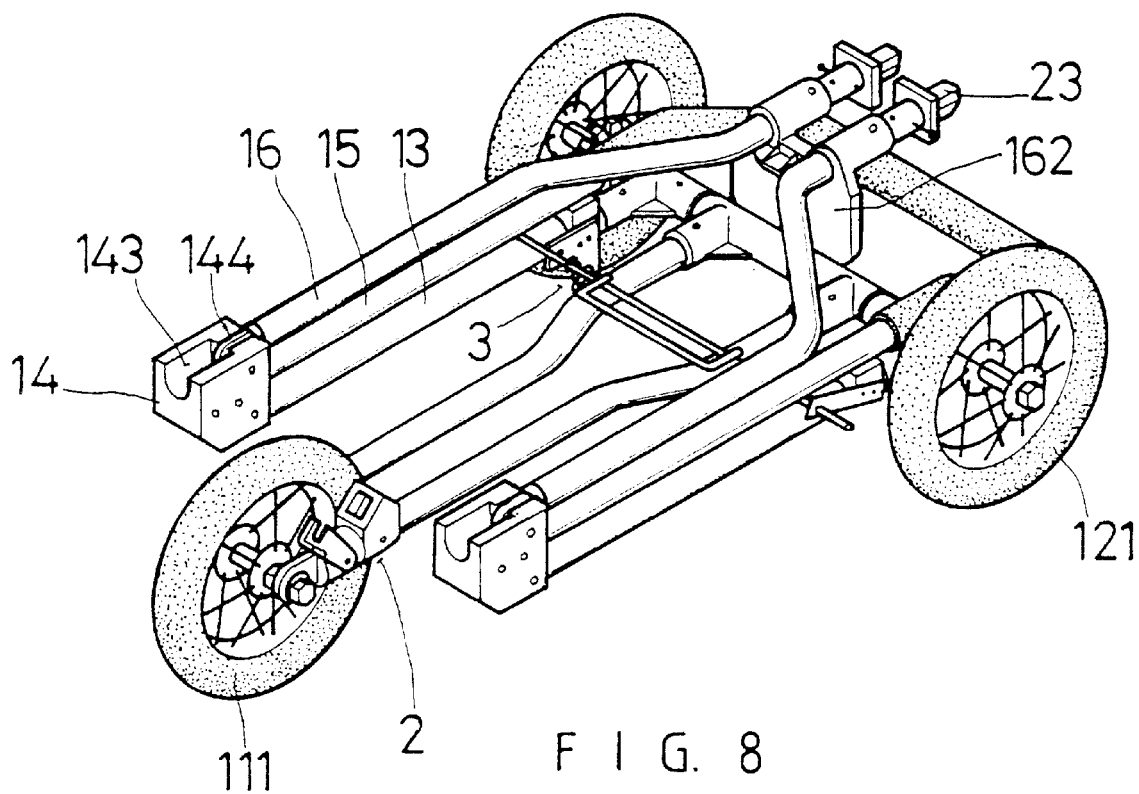
F I G. 8

COLLAPSIBLE TRICYCLE FRAME DEVICE

BACKGROUND OF THE INVENTION

The present invention relates to a collapsible tricycle frame device. More particularly, the present invention relates to a collapsible tricycle frame device which can be folded into a compact configuration.

A conventional tricycle frame device cannot be folded into a compact configuration. The conventional tricycle frame device occupies a large room while it is not used.

SUMMARY OF THE INVENTION

An object of the present invention is to provide a collapsible tricycle frame device which can be folded into a compact configuration.

Accordingly, a collapsible tricycle frame device comprises a generally U-shaped handle, first and second push bars connected to first and second ends of the generally U-shaped handle respectively, a first seat receiving a lower end of the first push bar, a second seat receiving a lower end of the second push bar, first and second front support rods disposed beneath the first and second push bars respectively, and first and second rear support rods disposed under the first and second push bars respectively. The first seat receives an upper end of the first front support rod and an upper end of the first rear support rod. The second seat receives an upper end of the second front support rod and an upper end of the second rear support rod. A rear wheel support device receives a lower end of the first rear support rod and a lower end of the second rear support rod. A front wheel support device receives a lower end of the first front support rod and a lower end of the second front support rod. First and second base rods are disposed between the front wheel support device and the rear wheel support device. The first front support rod has a first pivot end. The first rear support rod has a first pivot end. A first V-shaped recess is formed on a lower portion of the first seat to receive the first pivot end of the first rear support rod. A first groove is formed on a middle portion of the first seat to receive a first distal end of the first push bar. A first slot is formed on an upper portion of the first seat to receive the first pivot end of the first front support rod. The second front support rod has a second pivot end. The second rear support rod has a second pivot end. A second V-shaped recess is formed on a lower portion of the second seat to receive the second pivot end of the second rear support rod. A second groove is formed on a middle portion of the second seat to receive a second distal end of the second push bar. A second slot is formed on an upper portion of the second seat to receive the second pivot end of the second front support rod. The front wheel support device has a first positioning mount, a second positioning mount parallel to the first positioning mount, a first retaining plate disposed in a front of the first positioning mount, and a second retaining plate disposed in a front of the second positioning mount. A first boss is disposed on the first positioning mount. A first inserted hole is formed on the first boss. A first drive plate is disposed on a front portion of the first retaining plate. A first hook end is formed on a front end of the first retaining plate. A second boss is disposed on the second positioning mount. A second inserted hole is formed on the second boss. A second drive plate is disposed on a front portion of the first retaining plate. A first hook end is formed on a front end of the first retaining plate. A first pivot shaft fastens the first positioning mount and the first retaining plate. A second pivot shaft fastens the second positioning mount and the second retaining plate. A first inserted bar is disposed on a lower end of the first front support rod. A first elastic tenon is disposed on an end of the first inserted bar. A first protrusion is disposed on the lower end of the first front support rod. The first inserted bar is inserted in the first inserted hole. The first hook end hooks the first protrusion. A second inserted bar is disposed on a lower end of the second front support rod. A second elastic tenon is disposed on an end of the second inserted bar. A second protrusion is disposed on the lower end of the second front support rod. The second inserted bar is inserted in the second inserted hole. The second hook end hooks the second protrusion.

BRIEF DESCRIPTION OF THE DRAWINGS

FIGS. 5 and 6 are exploded views of a front wheel support device;

FIG. 8 is a perspective assembly view of a collapsible tricycle frame device which is folded into a compact configuration.

DETAILED DESCRIPTION OF THE INVENTION

Figure 1:
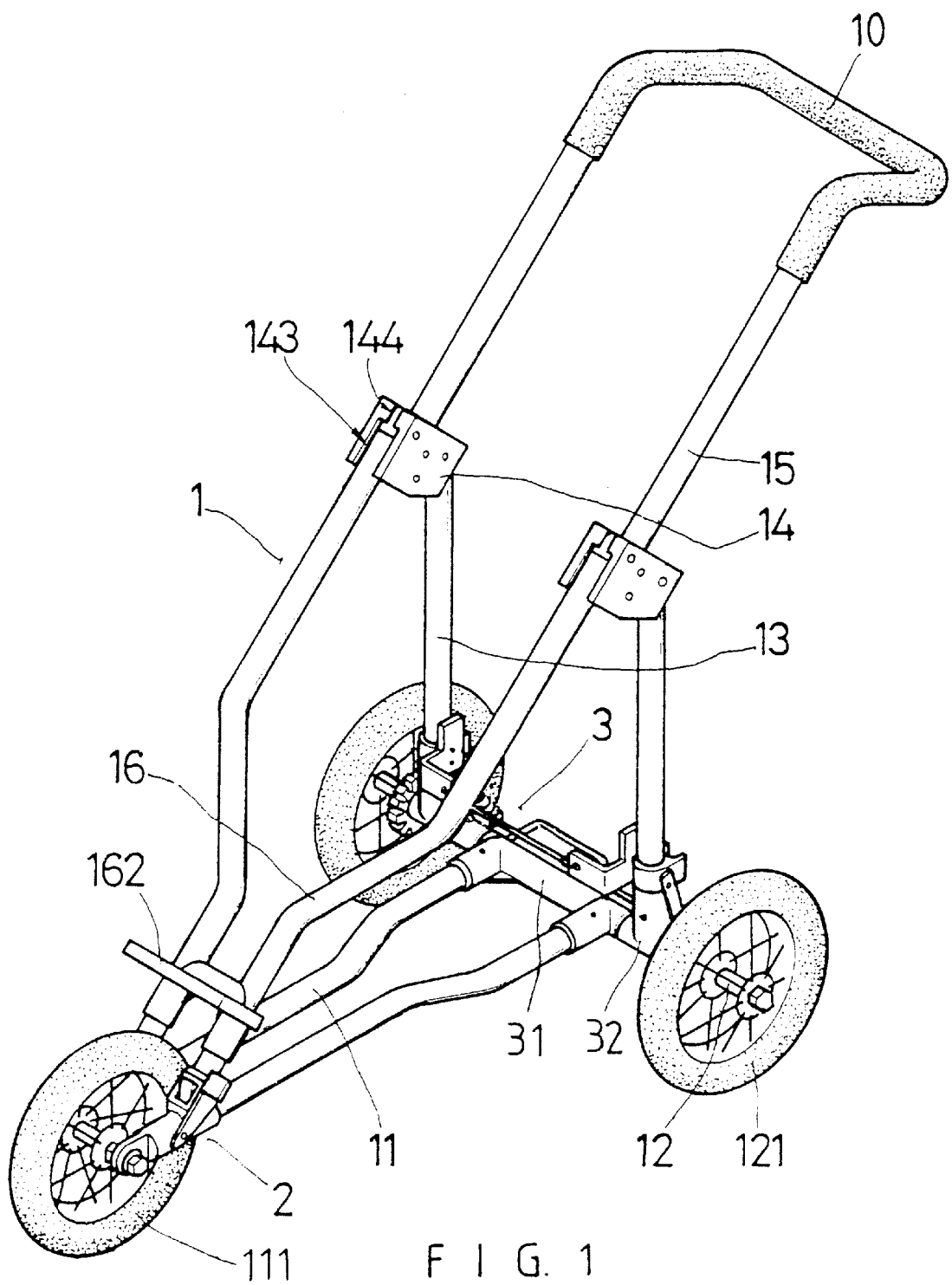
FIG. 1 is a perspective assembly view of a collapsible tricycle frame device of a preferred embodiment in accordance with the present invention.
Figure 2:
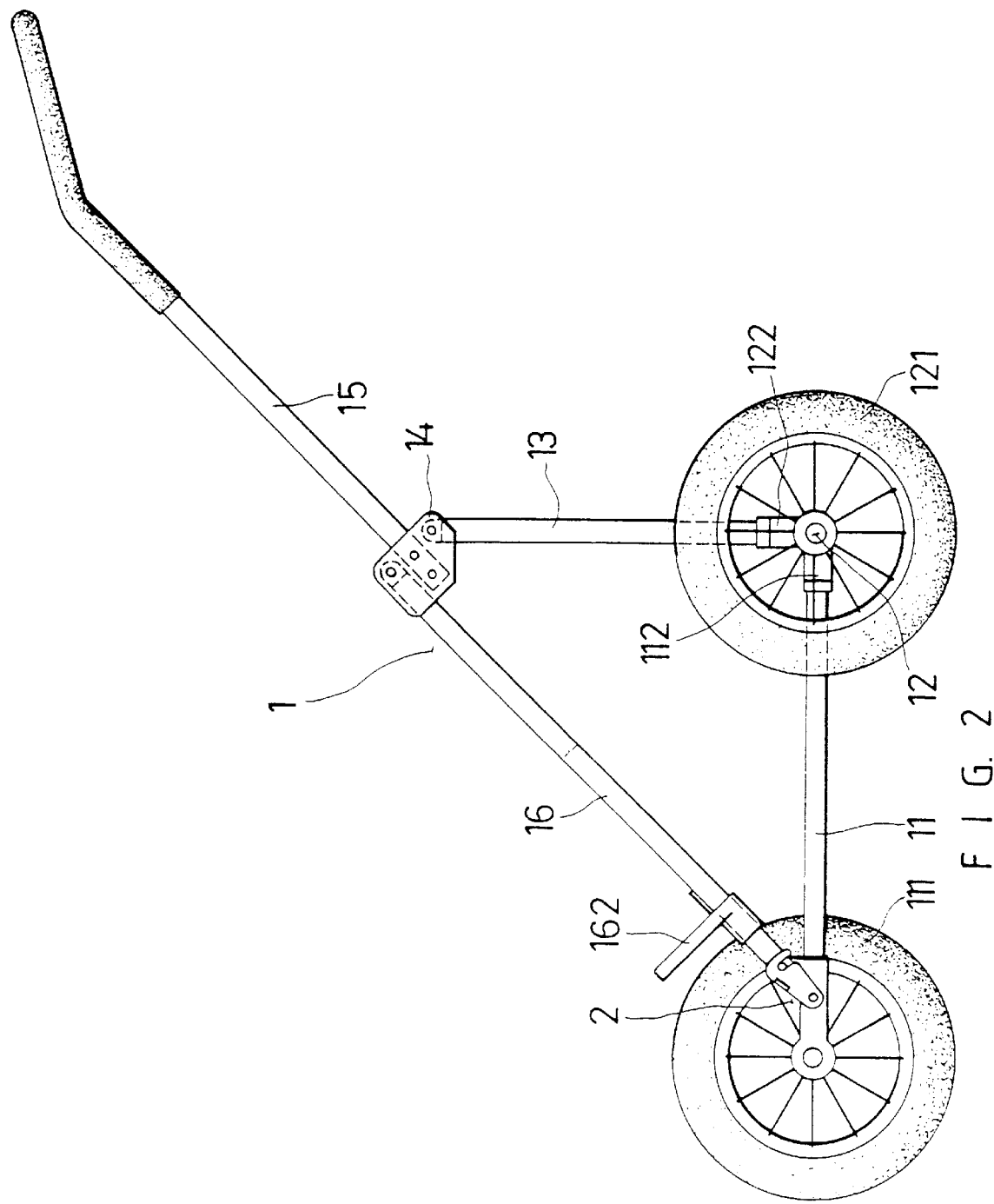
FIG. 2 is an elevational view of FIG. 1.
Figure 4:
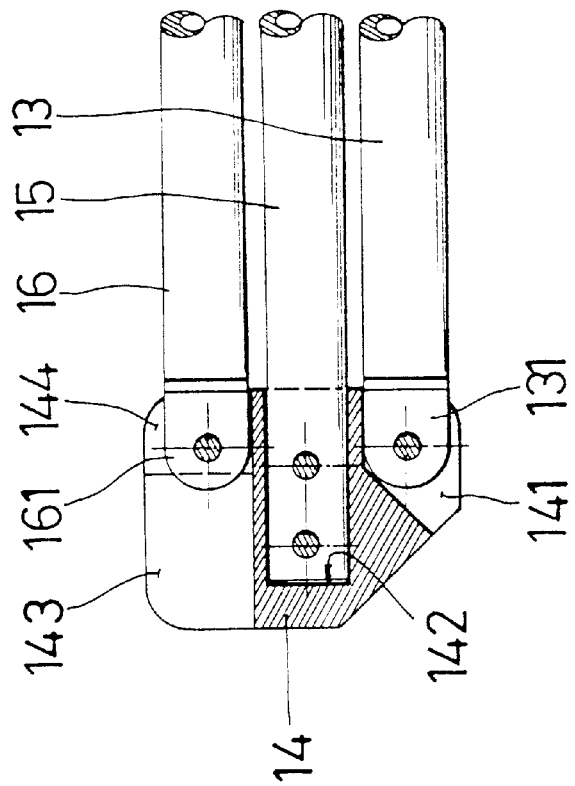
FIGS. 3 and 4 are schematic views illustrating an operation of a seat.
Figure 3:
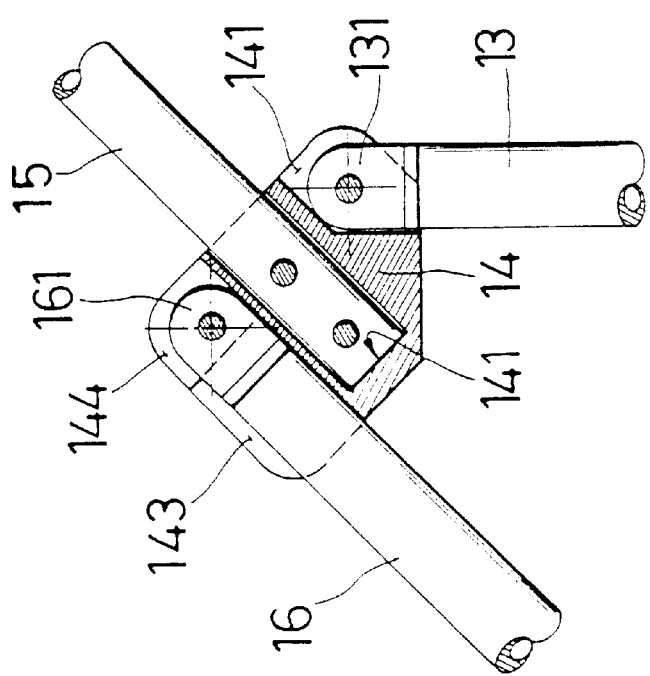

Referring to FIGS. 1 and 2, a collapsible tricycle frame device 1 comprises a generally U-shaped handle 10, first and second push bars 15 connected to first and second ends of the generally U-shaped handle 10 respectively, a first seat 14 receiving a lower end of the first push bar 15, a second seat 14 receiving a lower end of the second push bar 15, first and second front support rods 16 disposed beneath the first and second push bars 15 respectively, and first and second rear support rods 13 disposed under the first and second push bars 15 respectively. The first seat 14 receives an upper end of the first front support rod 16 and an upper end of the first rear support rod 13. The second seat 14 receives an upper end of the second front support rod 16 and an upper end of the second rear support rod 13. A rear wheel support device 3 receives a lower end of the first rear support rod 13 and a lower end of the second rear support rod 13. A front wheel support device 2 receives a lower end of the first front support rod 16 and a lower end of the second front support rod 16. First and second base rods 11 are disposed between the front wheel support device 2 and the rear wheel support device 3.

Referring to FIGS. 1 to 4, the first front support rod 16 has a first pivot end 161. The first rear support rod 13 has a first pivot end 131. A first V-shaped recess 141 is formed on a lower portion of the first seat 14 to receive the first pivot end 131 of the first rear support rod 13. A first groove 142 is formed on a middle portion of the first seat 14 to receive a first distal end of the first push bar 15. A first slot 144 is formed on an upper portion of the first seat 14 to receive the first pivot end 161 of the first front support rod 16. The second front support rod 16 has a second pivot end 161. The second rear support rod 13 has a second pivot end 131. A second V-shaped recess 141 is formed on a lower portion of the second seat 14 to receive the second pivot end 131 of the second rear support rod 13. A second groove 142 is formed on a middle portion of the second seat 14 to receive a second distal end of the second push bar 15. A second slot 144 is formed on an upper portion of the second seat 14 to receive the second pivot end 161 of the second front support rod 16.

Figure 6:
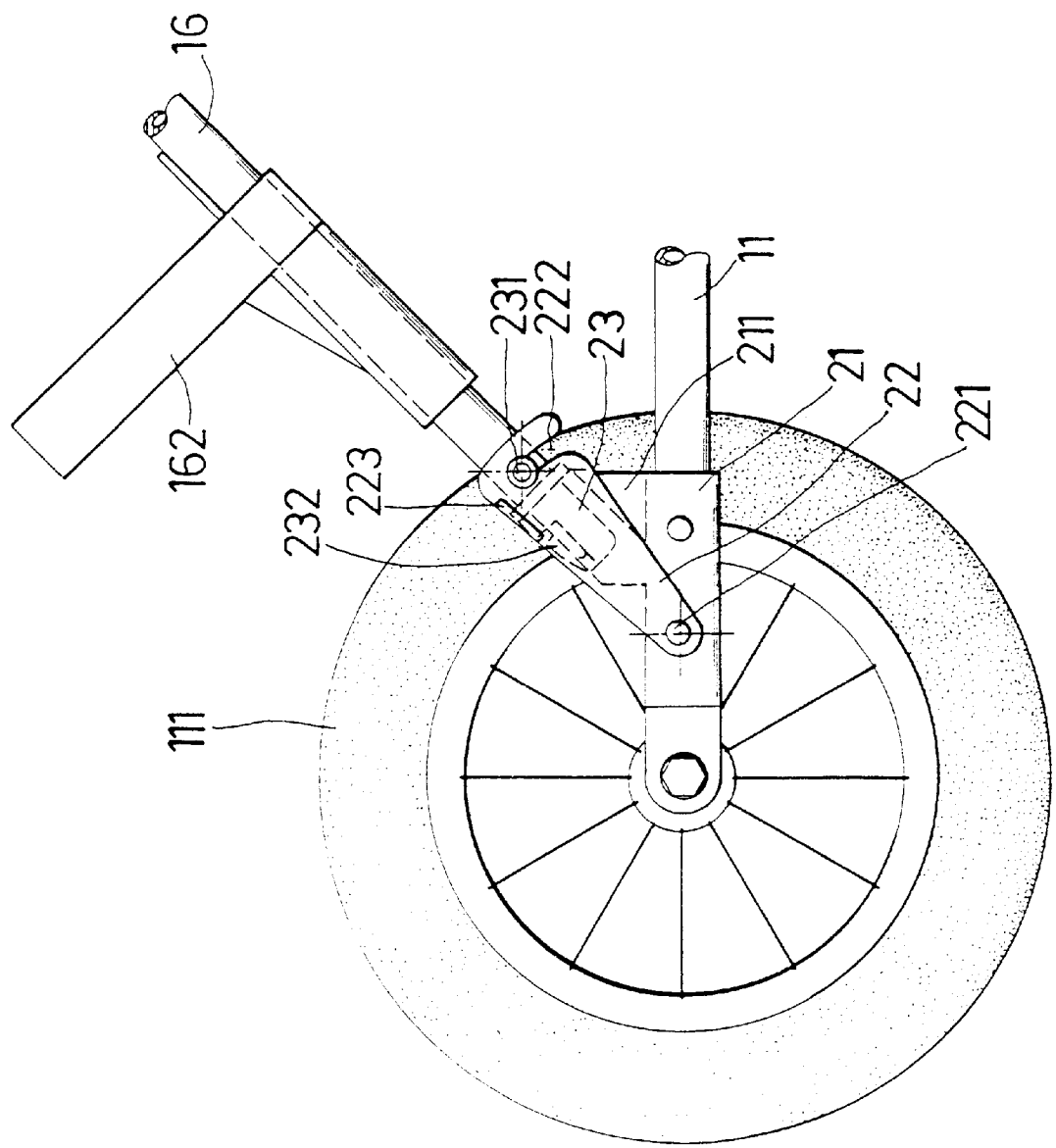

Referring to FIGS. 1, 5 and 6, the front wheel support device 2 has a first positioning mount 21, a second positioning mount 21 parallel to the first positioning mount 21, a first retaining plate 22 disposed in a front of the first positioning mount 21, and a second retaining plate 22 disposed in a front of the second positioning mount 21. A first boss 211 is disposed on the first positioning mount 21. A first inserted hole 212 is formed on the first boss 211. A first drive plate 223 is disposed on a front portion of the first retaining plate 22. A first hook end 222 is formed on a front end of the first retaining plate 22. A second boss 211 is disposed on the second positioning mount 21. A second inserted hole 212 is formed on the second boss 211. A second drive plate 223 is disposed on a front portion of the first retaining plate 22. A first hook end 222 is formed on a front end of the first retaining plate 22. A first pivot shaft 21 fastens the first positioning mount 21 and the first retaining plate 22. A second pivot shaft 21 fastens the second positioning mount 21 and the second retaining plate 22. A first inserted bar 23 is disposed on a lower end of the first front support rod 16. A first elastic tenon 232 is disposed on an end of the first inserted bar 23. A first protrusion 231 is disposed on the lower end of the first front support rod 16. The first inserted bar 23 is inserted in the first inserted hole 212. The first hook end 222 hooks the first protrusion 231. A second inserted bar 23 is disposed on a lower end of the second front support rod 16. A second elastic tenon 232 is disposed on an end of the second inserted bar 23. A second protrusion 231 is disposed on the lower end of the second front support rod 16. The second inserted bar 23 is inserted in the second inserted hole 212. The second hook end 222 hooks the second protrusion 231.

Referring to FIGS. 1 and 2 again, a pedal plate 162 is disposed on a lower portion of the first front support rod 16 and a lower portion of the second front support rod 16. The rear wheel support device 3 has a first T-shaped sleeve 32, a second T-shaped sleeve 32, a generally U-shaped pipe 31 having a first terminal joint to couple with the first T-shaped sleeve 32 and a second terminal joint to couple with the second T-shaped sleeve 32.

Figure 7:
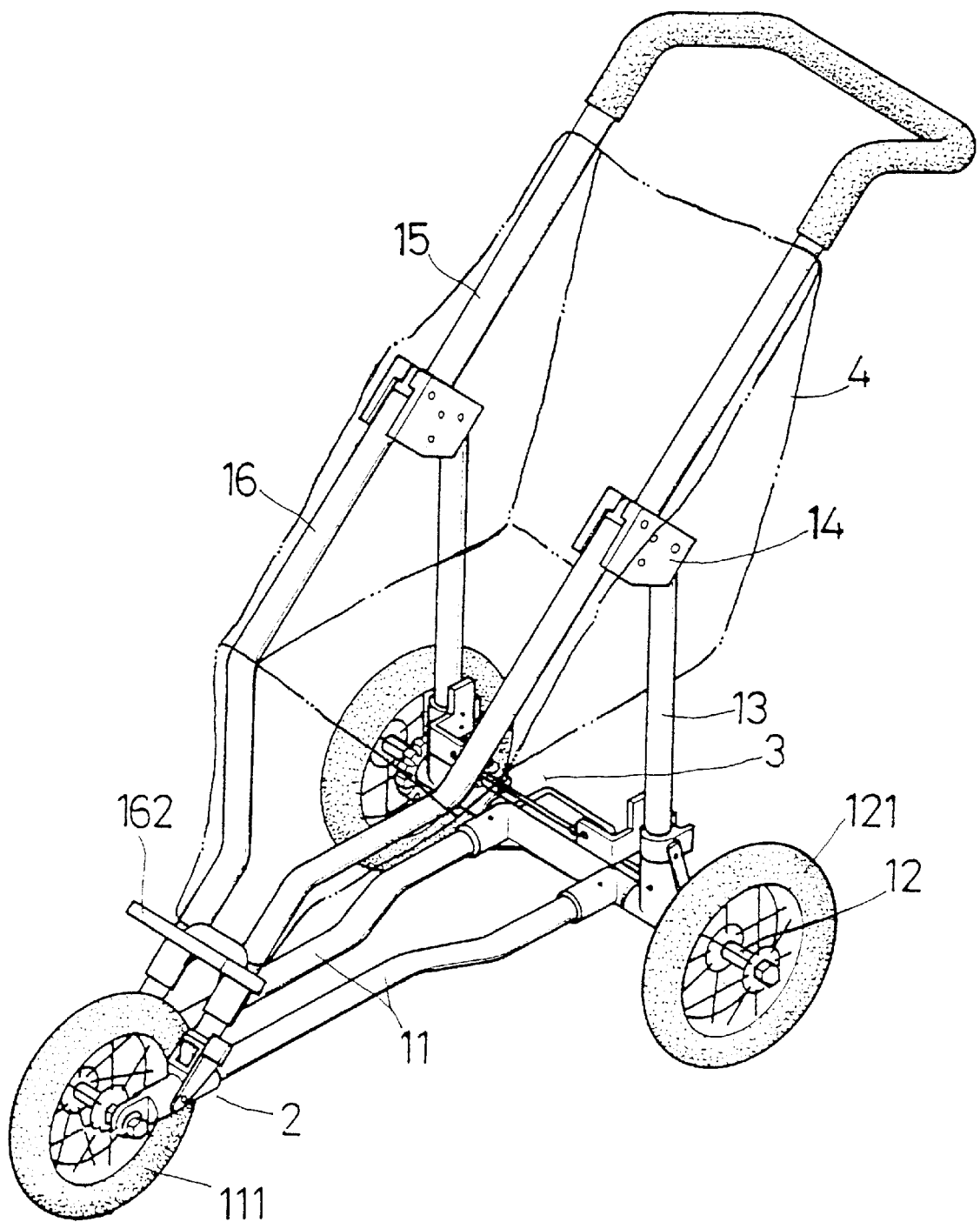
FIG. 7 is a schematic view illustrating a fabric disposed on a collapsible tricycle frame device.

Referring to FIG. 7, a fabric 4 is disposed on the collapsible tricycle frame device 1.

Referring to FIGS. 1 to 8, the first inserted bar 23 is disengaged from the first inserted hole 212. The second inserted bar 23 is disengaged from the second inserted hole 212. The first front support rod 16 and the first rear support rod 13 are rotated toward the generally U-shaped handle 10. The second inserted bar 23 is disengaged from the second inserted hole 212. The second front support rod 16 and the second rear support rod 13 are rotated toward the generally U-shaped handle 10. The generally U-shaped handle 10 is lowered toward the ground. Thus the collapsible tricycle frame device 1 is folded into a compact configuration.

The invention is not limited to the above embodiment but various modification thereof may be made. Further, various changes in form and detail may be made without departing from the scope of the invention.

I claim:

1. A collapsible tricycle frame device comprising:

a generally U-shaped handle having first and second ends, first and second push bars connected to the first and second ends of the generally U-shaped handle respectively, a first seat receiving a lower end of the first push bar, a second seat receiving a lower end of the second push bar, first and second front support rods disposed beneath the first and second push bars respectively, first and second rear support rods disposed under the first and second push bars respectively, the first seat receiving an upper end of the first front support rod and an upper end of the first rear support rod, the second seat receiving an upper end of the second front support rod and an upper end of the second rear support rod, a rear wheel support device receiving a lower end of the first rear support rod and a lower end of the second rear support rod, a front wheel support device receiving a lower end of the first front support rod and a lower end of the second front support rod, first and second base rods disposed between the front wheel support device and the rear wheel support device, the first front support rod having a first pivot end, the first rear support rod having a first pivot end, a first V-shaped recess formed on a lower portion of the first seat to receive the first pivot end of the first rear support rod, a first groove formed on a middle portion of the first seat to receive a first distal end of the first push bar, a first slot formed on an upper portion of the first seat to receive the first pivot end of the first front support rod, the second front support rod having a second pivot end, the second rear support rod having a second pivot end, a second V-shaped recess formed on a lower portion of the second seat to receive the second pivot end of the second rear support rod, a second groove formed on a middle portion of the second seat to receive a second distal end of the second push bar, a second slot formed on an upper portion of the second seat to receive the second pivot end of the second front support rod, the front wheel support device having a first positioning mount, a second positioning mount parallel to the first positioning mount, a first retaining plate disposed in a front of the first positioning mount, and a second retaining plate disposed in a front of the second positioning mount, a first boss disposed on the first positioning mount, a first inserted hole formed on the first boss, a first drive plate disposed on a front portion of the first retaining plate, a first hook end formed on a front end of the first retaining plate, a second boss disposed on the second positioning mount, a second inserted hole formed on the second boss, a second drive plate disposed on a front portion of the first retaining plate, a first hook end formed on a front end of the first retaining plate, a first pivot shaft fastening the first positioning mount and the first retaining plate, a second pivot shaft fastening the second positioning mount and the second retaining plate, a first inserted bar disposed on a lower end of the first front support rod, a first elastic tenon disposed on an end of the first inserted bar, a first protrusion disposed on the lower end of the first front support rod, the first inserted bar inserted in the first inserted hole, the first hook end hooking the first protrusion, a second inserted bar disposed on a lower end of the second front support rod, a second elastic tenon disposed on an end of the second inserted bar, a second protrusion disposed on the lower end of the second front support rod, the second inserted bar inserted in the second inserted hole, and the second hook end hooking the second protrusion.

2. A collapsible tricycle frame device as claimed in claim 1, wherein the rear wheel support device has a first T-shaped sleeve, a second T-shaped sleeve, a generally U-shaped pipe having a first terminal joint to couple with the first T-shaped sleeve and a second terminal joint to couple with the second T-shaped sleeve.

3. A collapsible tricycle frame device as claimed in claim 1, wherein a pedal plate is disposed on a lower portion of the first front support rod and a lower portion of the second front support rod.

\* \* \* \* \*